United States Patent
Kakishima et al.

(10) Patent No.: US 12,549,957 B2
(45) Date of Patent: Feb. 10, 2026

(54) TERMINAL AND COMMUNICATION METHOD

(71) Applicant: NTT DOCOMO, INC., Tokyo (JP)

(72) Inventors: Yuichi Kakishima, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 400 days.

(21) Appl. No.: 17/759,153

(22) PCT Filed: Feb. 13, 2020

(86) PCT No.: PCT/JP2020/005661
§ 371 (c)(1),
(2) Date: Jul. 20, 2022

(87) PCT Pub. No.: WO2021/161478
PCT Pub. Date: Aug. 19, 2021

(65) Prior Publication Data
US 2023/0354048 A1   Nov. 2, 2023

(51) Int. Cl.
*H04W 16/14* (2009.01)
(52) U.S. Cl.
CPC ................ *H04W 16/14* (2013.01)
(58) Field of Classification Search
CPC ..... H04W 16/14; H04W 16/16; H04W 24/10; H04W 72/04; H04W 72/12; H04W 72/23; H04W 72/54; H04W 88/06; H04L 5/0032; H04L 5/001; H04L 5/0023; H04L 5/0028; H04L 5/0044; H04L 5/0048; H04L 5/0057; H04L 5/0092
USPC ........................................................ 455/454
See application file for complete search history.

(56) References Cited

U.S. PATENT DOCUMENTS

| | | | |
|---|---|---|---|
| 9,723,437 B1* | 8/2017 | Bitra | H04W 64/00 |
| 2005/0002475 A1* | 1/2005 | Menolfi | H04L 25/497 375/340 |
| 2010/0091678 A1* | 4/2010 | Chen | H04B 7/024 370/252 |
| 2011/0026421 A1* | 2/2011 | Luo | H04B 7/024 370/252 |
| 2011/0141927 A1* | 6/2011 | Luo | H04B 7/0413 370/252 |
| 2013/0315081 A1* | 11/2013 | Kim | H04B 7/0486 370/252 |
| 2014/0050280 A1* | 2/2014 | Stirling-Gallacher | H04B 7/0665 375/296 |

(Continued)

FOREIGN PATENT DOCUMENTS

CN        102474474 A  *  5/2012  ............. H04B 1/005

OTHER PUBLICATIONS

3GPP TSG-RAN WG2 NR Ad Hoc; R2-1700043 "RAN WG's progress on NR technology SI in the November meeting" NTT Docomo, Inc. (Rapporteur); Spokane, USA; Jan. 17-19, 2017 (24 pages).

(Continued)

*Primary Examiner* — Jean A Gelin
(74) *Attorney, Agent, or Firm* — Osha Bergman Watanabe & Burton LLP

(57) ABSTRACT

A terminal includes a reception unit configured to receive a reference signal of a first RAT (Radio Access Technology) and a data signal of a second RAT; and a control unit configured to decode the data signal based on precoder information applied to the reference signal and to the data signal.

4 Claims, 13 Drawing Sheets

(56) References Cited

U.S. PATENT DOCUMENTS

| | | | | |
|---|---|---|---|---|
| 2014/0302796 | A1* | 10/2014 | Gormley | H04B 17/345 |
| | | | | 455/67.13 |
| 2016/0182202 | A1* | 6/2016 | Patel | H04L 27/2614 |
| | | | | 370/336 |
| 2016/0373178 | A1* | 12/2016 | Nam | H04B 7/0639 |
| 2017/0311189 | A1* | 10/2017 | Almalfouh | H04W 56/0035 |
| 2017/0353222 | A1* | 12/2017 | Wei | H04W 72/23 |
| 2019/0013881 | A1* | 1/2019 | Olesen | H04B 7/0413 |
| 2019/0312700 | A1* | 10/2019 | John Wilson | H04L 5/0035 |
| 2020/0220590 | A1* | 7/2020 | Sun | H04L 25/0391 |
| 2020/0220688 | A1* | 7/2020 | Kim | H04L 5/0048 |
| 2020/0374815 | A1* | 11/2020 | Bi | H04W 52/30 |
| 2021/0281448 | A1* | 9/2021 | Li | H04W 72/21 |
| 2022/0038234 | A1* | 2/2022 | Frenne | H04L 5/0048 |
| 2022/0141692 | A1* | 5/2022 | Chang | H04W 24/10 |
| | | | | 370/252 |
| 2022/0407653 | A1* | 12/2022 | Kakishima | H04W 76/15 |

OTHER PUBLICATIONS

Extended European Search Report issued in European Application No. 20918752.5, dated Oct. 19, 2023 (8 pages).
3GPP TSG RAN Meeting #86; RP-192678 "New WID on NR Dynamic spectrum sharing (DSS)" Ericsson; Sitges, Spain; Dec. 9-12, 2019 (3 pages).
3GPP TS38.300 V15.8.0 "3rd Generation Partnership Project; Technical Specification Group Radio Access Network; NR; NR and NG-RAN Overall Description; Stage 2 (Release 15)" Dec. 2019 (99 pages).
International Search Report issued in International Application No. PCT/JP2020/005661, mailed Aug. 25, 2020 (3 pages).
Written Opinion issued in International Application No. PCT/JP2020/005661; Dated Aug. 25, 2020 (3 pages).

* cited by examiner

TERMINAL AND COMMUNICATION METHOD

FIELD OF THE INVENTION

The present invention relates to a terminal and a communication method in a wireless communication system.

BACKGROUND OF THE INVENTION

Regarding NR (New Radio) (also referred to as "5G"), or a successor system to LTE (Long Term Evolution), technologies have been discussed which satisfy the following requirements: a high capacity system, high data transmission rate, low delay, simultaneous connection of multiple terminals, low cost, power saving, etc. (for example, Non-Patent Document 1).

Dynamic spectrum sharing (DSS) for enabling LTE and NR to coexist in the same band has been discussed (for example, Non-Patent Document 2). Coexistence of different RATS (Radio Access Technology) in a single carrier allows flexibility in meeting the traffic demand during the system generation switching period.

CITATION LIST

Non-Patent Document

[Non-Patent Document 1] 3GPP TS 38.300 V15.8.0 (2019-12)
[Non-Patent Document 2] 3GPP TSG RAN Meeting #86 RP-192678 (2019-12)

SUMMARY OF THE INVENTION

Technical Problem

Under current DSS specifications, signals for synchronization are transmitted to LTE terminals and NR terminals, respectively. In other words, because signals having similar functions are transmitted to each RAT (Radio Access Technology), the overhead in the entire system is increased.

The present invention has been made in view of the foregoing, and is intended to reduce the overhead in a wireless communication system when multiple RATS (Radio Access Technology) are enabled to coexist in a single carrier.

Solution to Problem

According to the disclosed technique, a terminal is provided. The terminal includes a reception unit configured to receive a reference signal of a first RAT (Radio Access Technology) and a data signal of a second RAT; and a control unit configured to decode the data signal based on precoder information applied to the reference signal and to the data signal.

Advantageous Effects of Invention

According to the disclosed technique, the overhead in a wireless communication system can be reduced in a case where multiple RATS (Radio Access Technology) are enabled to coexist in a single carrier.

DETAILED DESCRIPTION OF THE PREFERRED EMBODIMENTS

Figure 1:
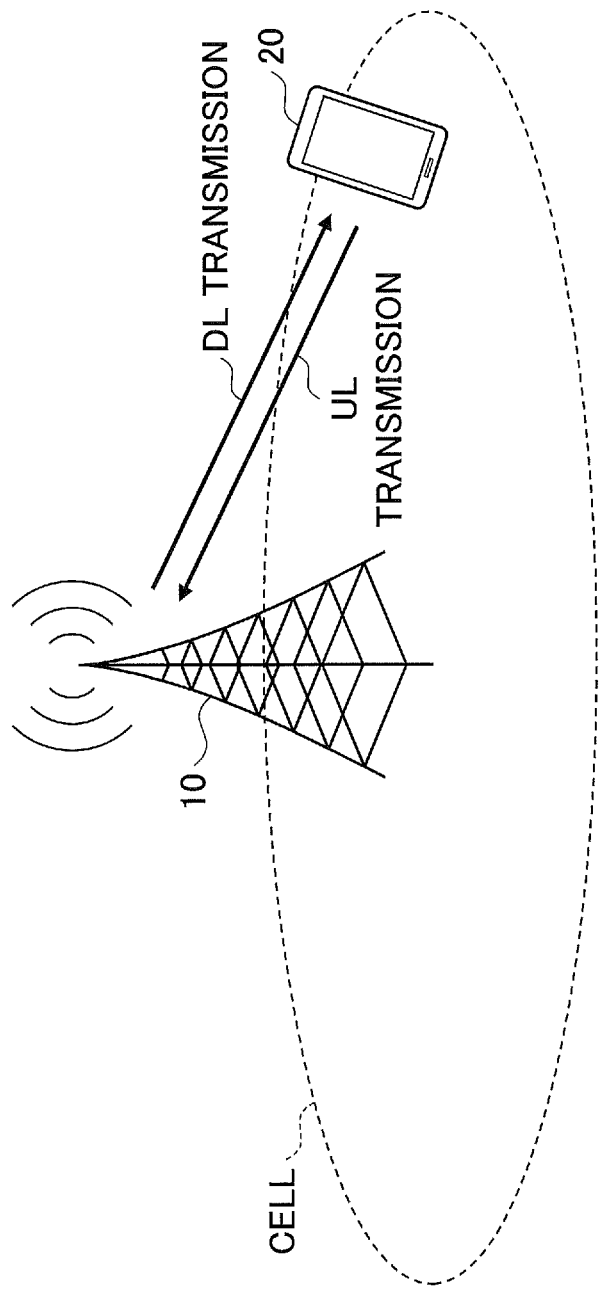
FIG. 1 is a drawing illustrating a configuration example of a wireless communication system according to an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Furthermore, in one or more embodiments described below, terms that are used in the existing LTE are used, such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), etc. The above-described terms are used for the sake of description convenience. Signals, functions, etc., which are similar to the above-described terms, may be referred to as different names. Further, terms, which are used in NR and correspond to the above-described terms, are NR-SS, NR-PSS, NR-SSS, NR-PBCH, NR-PRACH, etc. However, even when a signal is used for NR, there may be a case in which the signal is not referred to as "NR-".

Furthermore, in an embodiment of the present invention, the duplexing method may be TDD (Time Division Duplexing), FDD (Frequency Division Duplexing), or other methods (e.g., Flexible Duplexing, or the like).

Further, in an embodiment of the present invention, the expression, radio (wireless) parameters are "configured (set)" may mean that a predetermined value is pre-configured, or may mean that a radio parameter indicated by the base station 10 or the terminal 20 is configured.

FIG. 1 is a drawing illustrating a configuration example of a wireless communication system according to an embodiment of the present invention. As illustrated in FIG. 1, a wireless communication system according to an embodiment of the present invention includes a base station 10 and a terminal 20. In FIG. 1, a single base station 10 and a single terminal 20 are illustrated as an example. There may be a plurality of base stations 10 and a plurality of terminals 20.

The base station 10 is a communication apparatus that provides one or more cells and performs wireless communications with the terminal 20. Physical resources of radio signals may be defined in the time domain and the frequency domain, the time domain may be defined by the number of OFDM (Orthogonal Frequency Division Multiplexing) symbols, and the frequency domain may be defined by the number of sub-carriers or resource blocks. The base station 10 transmits a synchronization signal and system information to the terminal 20. The synchronization signal is, for example, an NR-PSS and an NR-SSS. The system information is transmitted via, for example, a NR-PBCH, and may be referred to as broadcast information. The synchronization signal and the system information may be referred to as an SSB (SS/PBCH block). As shown in FIG. 1, the base station 10 transmits a control signal or data in DL (Downlink) to the terminal 20 and receives a control signal or data in UL (Uplink) from the terminal 20. The base station 10 and terminal 20 are capable of transmitting and receiving a signal by performing the beamforming. Further, the base station 10 and the terminal 20 can both apply MIMO (Multiple Input Multiple Output) communication to DL or UL. Further, the base station 10 and the terminal 20 may both perform communications via a secondary cell (Scell: Secondary Cell) and a primary cell (PCell: Primary Cell) using CA (Carrier Aggregation). In addition, the terminal 20 may perform communications via a primary cell of the base station 10 and a primary secondary cell (PSCell: Primary Secondary Cell) of another base station 10 using DC (Dual Connectivity).

The terminal 20 may be a communication apparatus that includes a wireless communication function such as a smartphone, a mobile phone, a tablet, a wearable terminal, a communication module for M2M (Machine-to-Machine), or the like. As shown in FIG. 1, the terminal 20 uses various communication services provided by the wireless communication system by receiving control signals or data in DL from the base station 10 and transmitting control signals or data in UL to the base station 10. In addition, the terminal 20 receives various reference signals transmitted from the base station 10 and performs measurement of the propagation path quality based on the reception result of the reference signals.

Hereinafter, an example of a DSS (Dynamic Spectrum Sharing) technology that allows LTE and NR to coexist in the same band will be described. According to the DSS technology, coexistence of different RATS (Radio Access Technology) in a single carrier allows flexibility in meeting the traffic demand during the system generation switching period.

Figure 2:
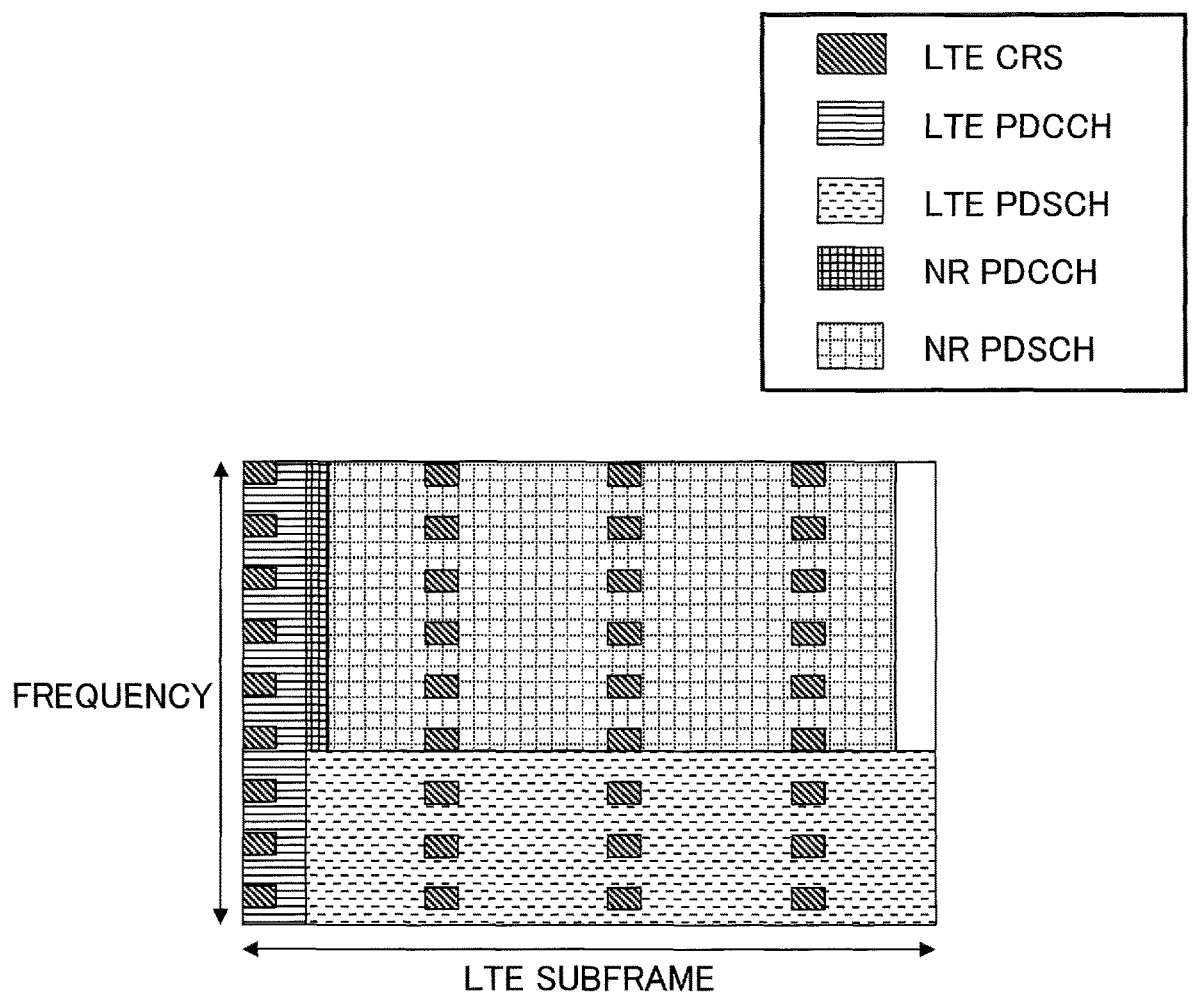
FIG. 2 is a drawing illustrating a downlink channel arrangement example according to DSS.

FIG. 2 is a drawing illustrating a downlink channel arrangement example according to DSS. The time domain illustrated in FIG. 2 corresponds to one (1) subframe of LTE. As shown in FIG. 2, in the downlink, "LTE-CRS (Cell specific reference signal)", "LTE-PDCCH", and "LTE-PDSCH" are transmitted as LTE signals or channels. Further", as shown in FIG. 2, in the downlink, "NR-PDCCH" and "NR-PDSCH" are transmitted as NR channels. For example, not shown in the figure, but "NR-PDSCH" may include resources in which DM-RS (Demodulation reference signal) is arranged. For example, as shown in FIG. 2, "LTE-CRS" may be and arranged adjacent to "NR-PDSCH".

Figure 3:
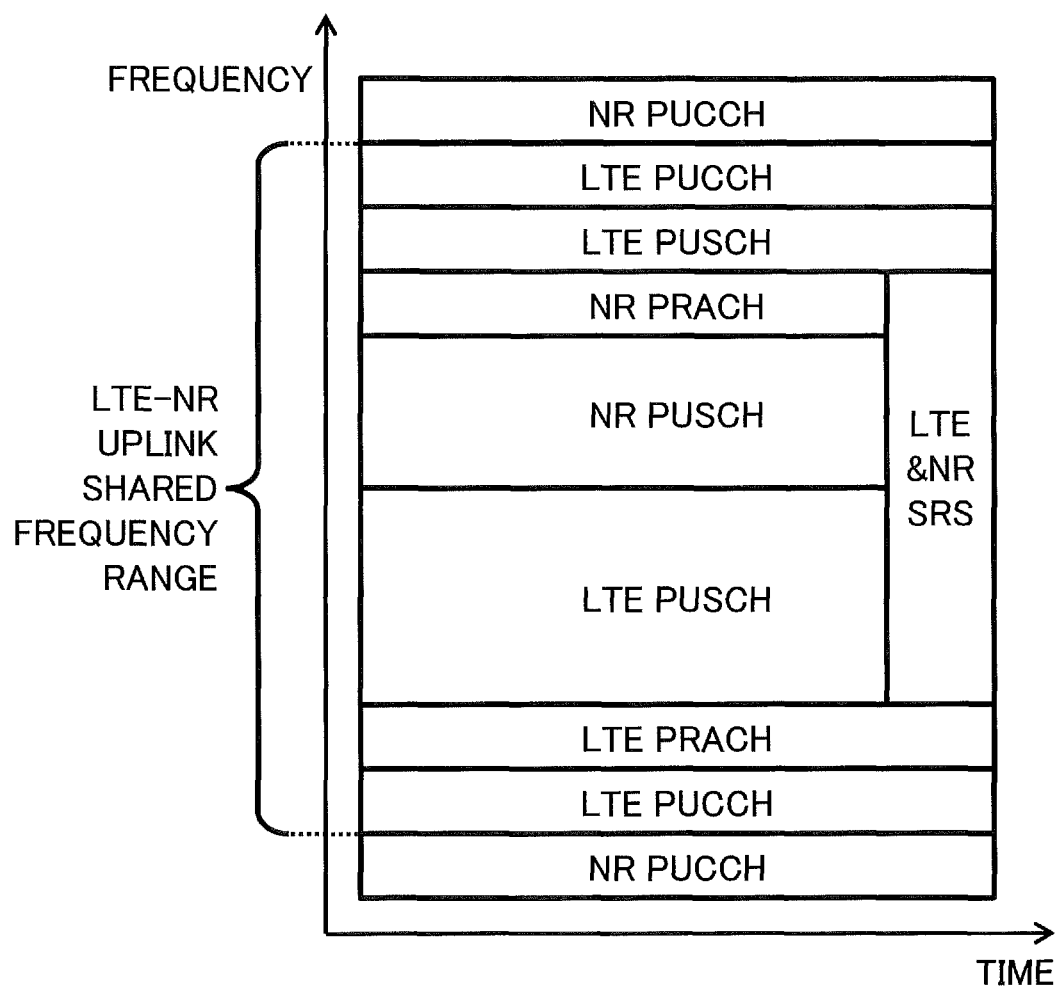
FIG. 3 is a drawing illustrating an uplink channel arrangement example according to DSS.

FIG. 3 is a drawing illustrating an uplink channel arrangement example according to DSS. As shown in FIG. 3, uplink channels or signals of the LTE and NR are arranged in a shared frequency band. As shown in FIG. 3, for example, "NR-PUCCH", "LTE-PUCCH", "LTE-PRACH", "LTE-PUSCH", "NR-PUSCH", "NR-PRACH", "LTE-PUSCH", "LTE-PUCCH", and "NR-PUCCH" are arranged in the order of frequency from low to high. In addition, "LTE-SRS (Sounding Reference Signal)" or "NR-SRS" may be arranged in the frequency domain in which "LTE-PUSCH", "NR-PUSCH" and "NR-PRACH" are arranged.

Figure 4:
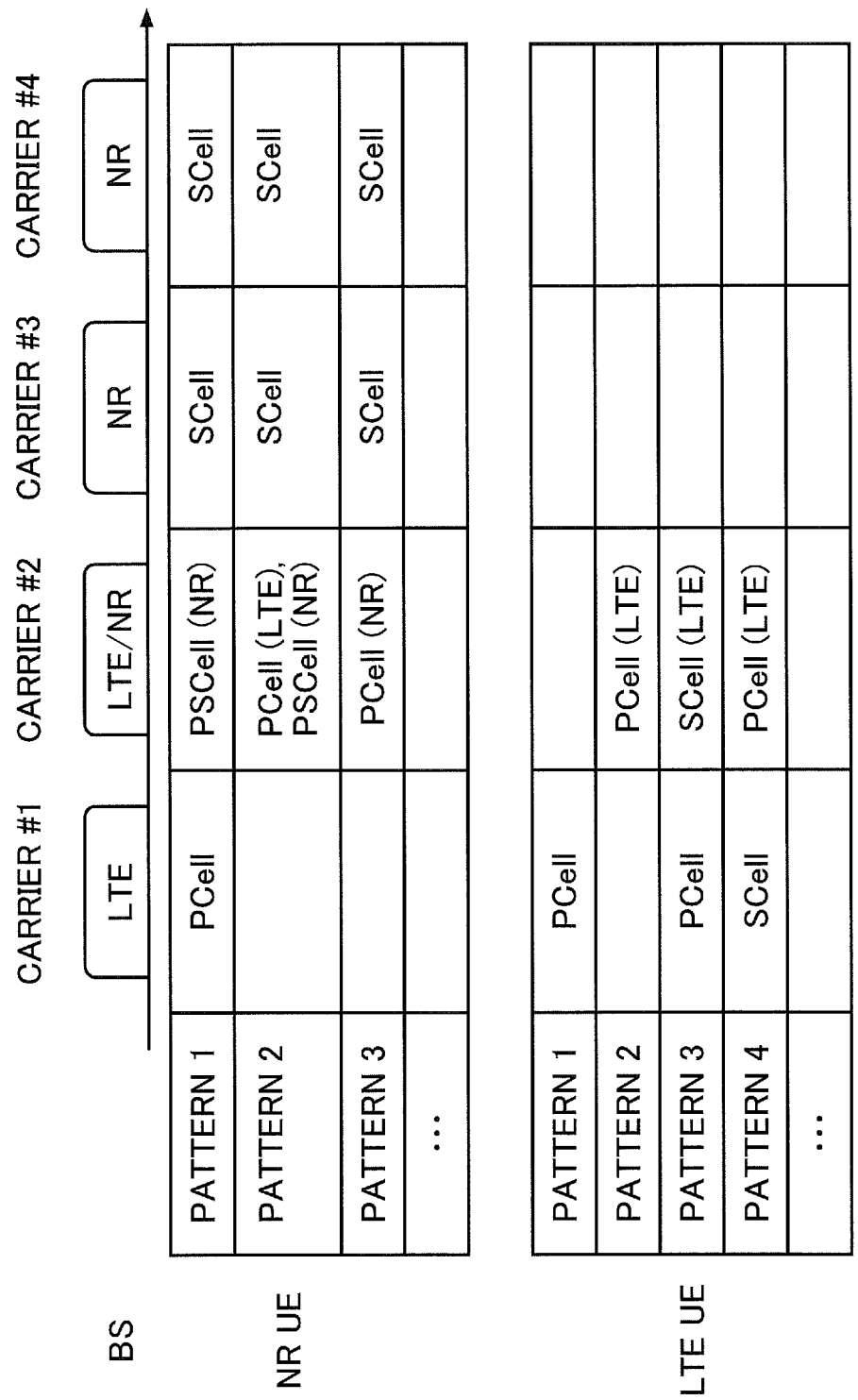
FIG. 4 is an example (1) of frequency allocations in DSS.

FIG. 4 is an example (1) of frequency allocations in DSS. As shown in FIG. 4, it is assumed that a BS (Base station) provides LTE in carrier #1, LTE and NR in carrier #2, NR in carrier #3, and NR in carrier #4.

For example, for an NR UE (User Equipment), as shown in pattern 1 in FIG. 4, an LTE PCell (Primary Cell) may be arranged in carrier #1, an NR PSell (Primary Secondary Cell) may be arranged in carrier #2, an SCell (Secondary Cell) may be arranged in carrier #3, and an SCell may be arranged in carrier #4. Further, for example, for an NR UE, as shown in pattern 2 in FIG. 4, an LTE PCell and an NR PSCell may be arranged in carrier #2, an SCell may be arranged in carrier #3, and an SCell may be arranged in carrier #4. Further, for example, for an NR UE, as shown in pattern 3 in FIG. 4, an NR PCell may be arranged in carrier #2, an SCell may be arranged in carrier #3, and an SCell may be arranged in carrier #4.

For example, for an LTE UE, as shown in pattern 1 in FIG. 4, an LTE PCell may be arranged in carrier #1. Further, for example, for an LTE UE, as shown in pattern 2 in FIG. 4, an LTE PCell may be arranged in carrier #2. Further, for example, for an LTE UE, as shown in pattern 3 in FIG. 4, an LTE PCell may be arranged in carrier #1, and an LTE SCell may be arranged in carrier #2. Further, for example, for an LTE UE, as shown in pattern 4 in FIG. 4, an LTE SCell may be arranged in carrier #1, and an LTE PCell may be arranged in carrier #2.

Figure 5:
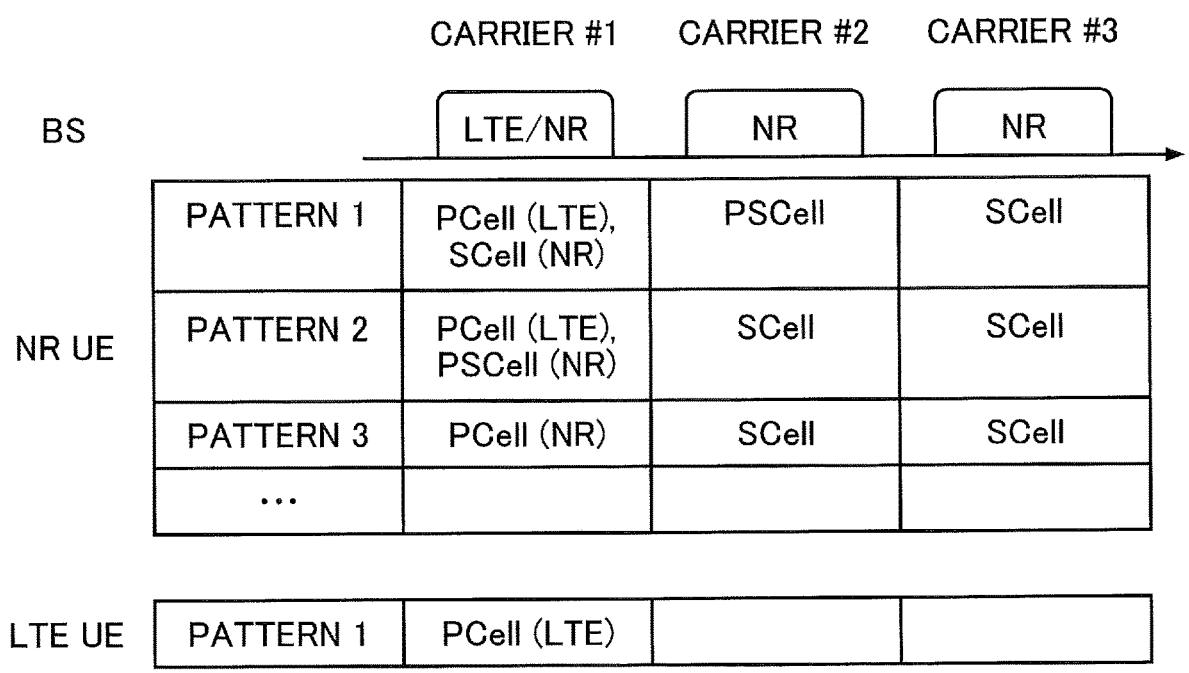
FIG. 5 is an example (2) of frequency allocations in DSS.

FIG. 5 is an example (2) of frequency allocations in DSS. As shown in FIG. 5, it is assumed that a BS provides LTE and NR in carrier #1, NR in carrier #2, and NR in carrier #3.

For example, for an NR UE, as shown in pattern 1 in FIG. 5, an LTE PCell and an NR SCell may be arranged in carrier #1, an NR PSCell may be arranged in carrier #2, and an NR SCell may be arranged in carrier #3. Further, for example, for an NR UE, as shown in pattern 2 in FIG. 5, an LTE PCell and an NR PSCell may be arranged in carrier #1, an NR PSCell may be arranged in carrier #2, and an NR SCell may be arranged in carrier #3. Further, for example, for an NR UE, as shown in pattern 3 in FIG. 5, an NR PCell may be arranged in carrier #1, an NR PSCell may be arranged in carrier #2, and an NR SCell may be arranged in carrier #3.

For example, for an LTE UE, as shown in pattern 1 in FIG. 5, an LTE PCell may be arranged in carrier #1.

Table 1 is an example illustrating synchronization signals and reference signals of LTE and NR with respect to each purpose.

TABLE 1

| Purpose | LTE | NR |
| --- | --- | --- |
| Synchronization (coarse) | LTE PSS/SSS | NR PSS/SSS |
| Synchronization (fine) | CRS | NR TRS |
| Downlink propagation path estimation | LTE CRS/CSI-RS | NR CSI-RS |
| Uplink propagation path estimation | LTE SRS | NR SRS |
| Phase noise estimation | N/A | NR PT-RS |
| Data decoding | LTE CRS/DM-RS | NR DM-RS |
| Broadcast signal decoding | CRS | NR PBCH DM-RS |

As shown in Table 1, in LTE and NR, corresponding signals are defined for each of the same or similar purposes. The "purpose" may mean "usage". For coarse synchronization, LTE-PSS/SSS are used in LTE, and NR-PSS/SSS are used in NR. For fine (high accuracy) synchronization, CRS is used in LTE, and NR-TRS is used in NR. NR-TRS may be referred to as NR-CSI (Channel State Information)-RS for tracking. For downlink propagation path estimation, LTE-CRS/CSI-RS are used in LTE, and NR-CSI-RS is used in NR. For uplink propagation path estimation, LTE-SRS is used in LTE, and NR-SRS is used in NR. For phase noise estimation, no signal is configured for this purpose in LTE, and NR-PT (Phase tracking)-RS is used in NR. For data decode, LTE-CRS/DM-RS are used in LTE, and NR-DM-RS is used in NR. For broadcast signal decode, CRS is used in LTE, and NR-PBCH-DM-RS is used in NR.

It is noted that, even if the names are the same, the configurations of physical signal may be different. For example, CSI-RS of LTE and CSI-RS of NR differ in the configuration of the physical signal.

Figure 6:
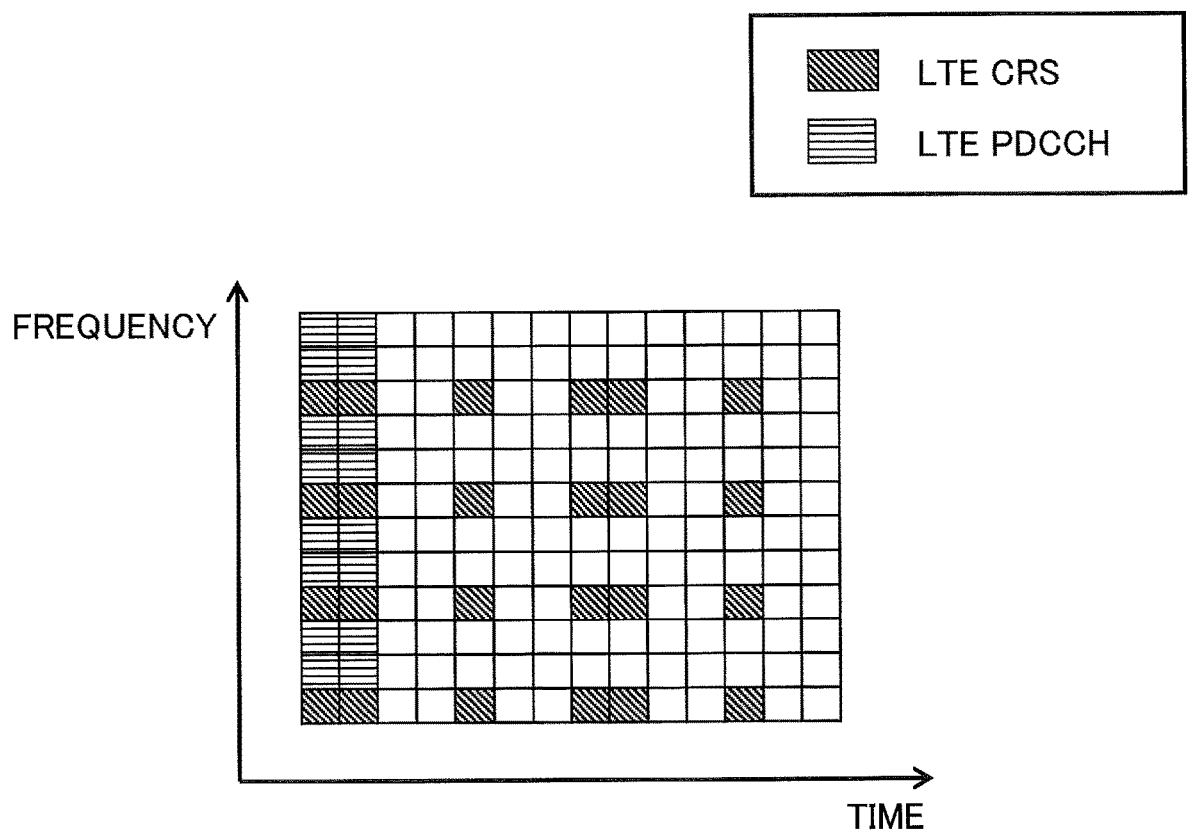
FIG. 6 is a drawing illustrating an LTE downlink channel arrangement example.

FIG. 6 is a drawing illustrating an LTE downlink channel arrangement example. The time domain shown in FIG. 6 corresponds to one LTE subframe, and the frequency domain corresponds to one resource block. As shown in FIG. 6, LTE-CRS is transmitted as a reference signal and LTE-PDCCH is transmitted as a control signal.

Figure 7:
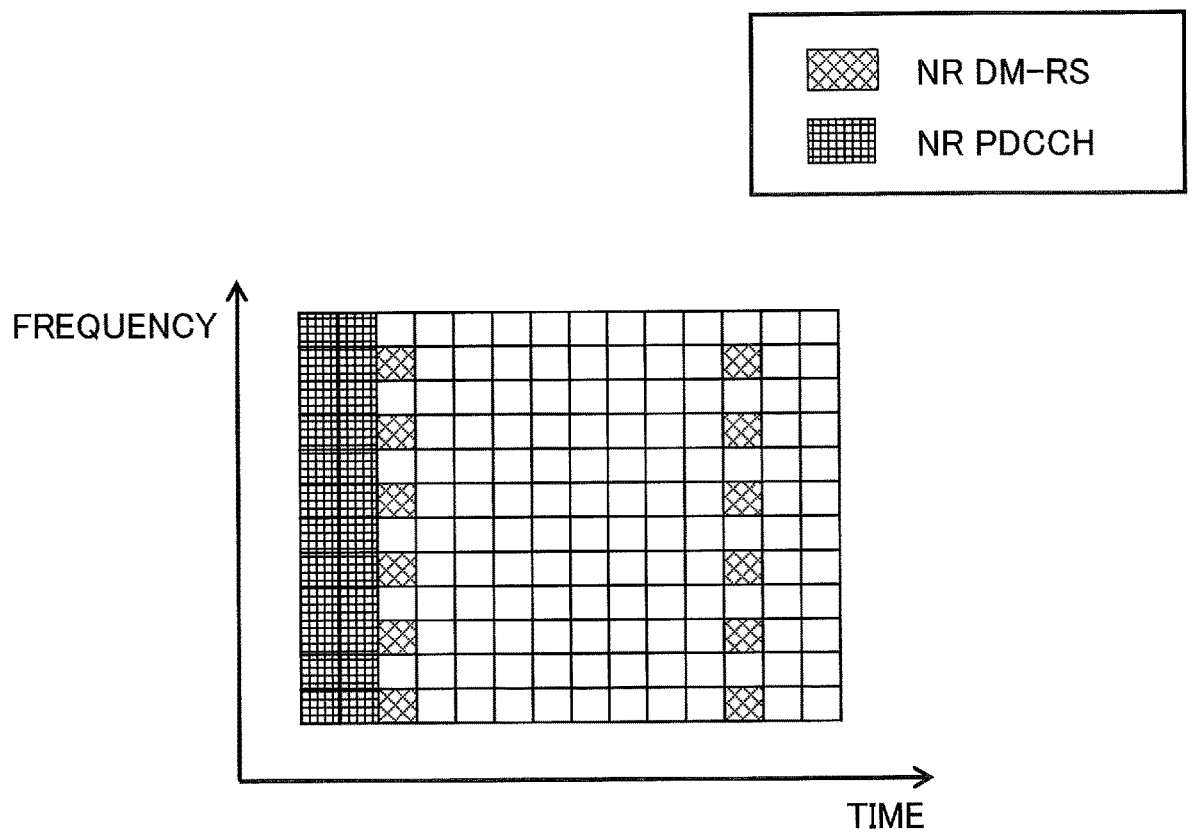
FIG. 7 is a drawing illustrating an NR downlink channel arrangement example.

FIG. 7 is a drawing illustrating an NR downlink channel arrangement example. It is assumed that the time domain shown in FIG. 7 corresponds to one NR slot, the frequency domain corresponds to one resource block, and a subcarrier spacing is 15 kHz. As shown in FIG. 7, NR-DM-RS is transmitted as a reference signal and NR-PDCCH is transmitted as a control signal.

Figure 8:
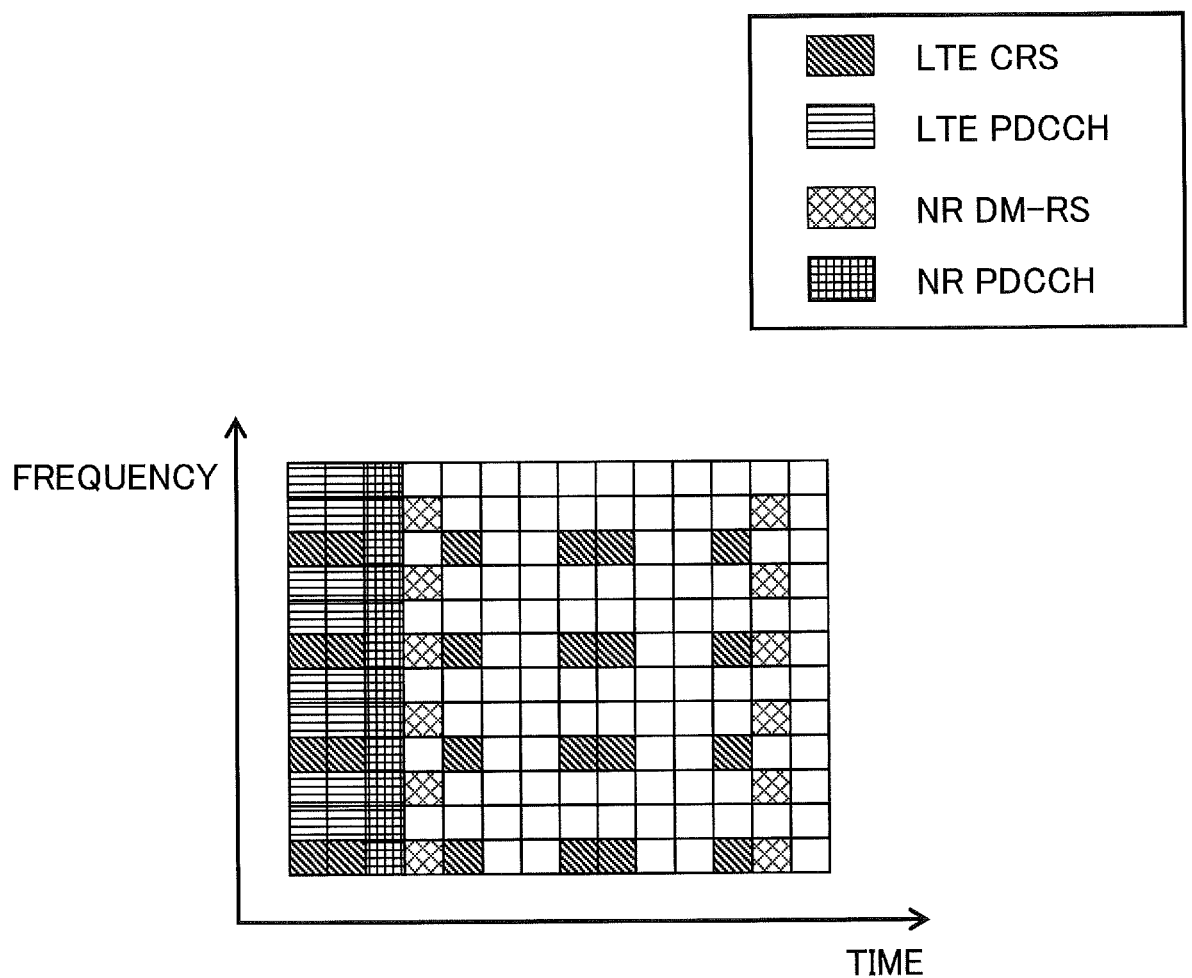
FIG. 8 is a drawing illustrating an LTE and NR downlink channel arrangement example according to DSS.

FIG. 8 is a drawing illustrating an LTE and NR downlink channel arrangement example according to DSS. In the current DSS specifications, corresponding signals for the same purpose are respectively transmitted to LTE terminals and NR terminals. As shown in FIG. 8, transmitting LTE and NR signals, respectively, increases the overhead and reduces the resources to transmit data.

Thus, the reduction of overhead is achieved by sharing some signals and/or channels between RATS. For example, the terminal 20 may receive an NR signal using LTE-CRS. In addition, for example, the terminal 20 may use LTE-SS to establish synchronization with an NR cell.

As described above, data reception using a reference signal of another RAT is considered to be effective for reducing overhead. For example, an NR terminal can reduce NR-DM-RS overhead significantly by decoding NR-PDSCH using LTE-CRS. Hereinafter, examples will be described in which an NR terminal performs data decoding using LTE-CRS. However, a combination of RATS or reference signals is not limited to these examples.

However, the design concept of the reference signal used for data decoding differs between LTE and NR. For example, in the CRS-based transmission method of LTE, precoding is not applied to CRS. In other words, a non-precoded-RS-based demodulation method is adopted. The PDSCH can be decoded by indicating the TPMI (Transmitted PMI) to the terminal 20. In NR, on the other hand, the same precoding, which is applied to PDSCH, is applied to DM-RS. In other words, a Precoded-RS-based demodulation method is adopted.

Figure 9:
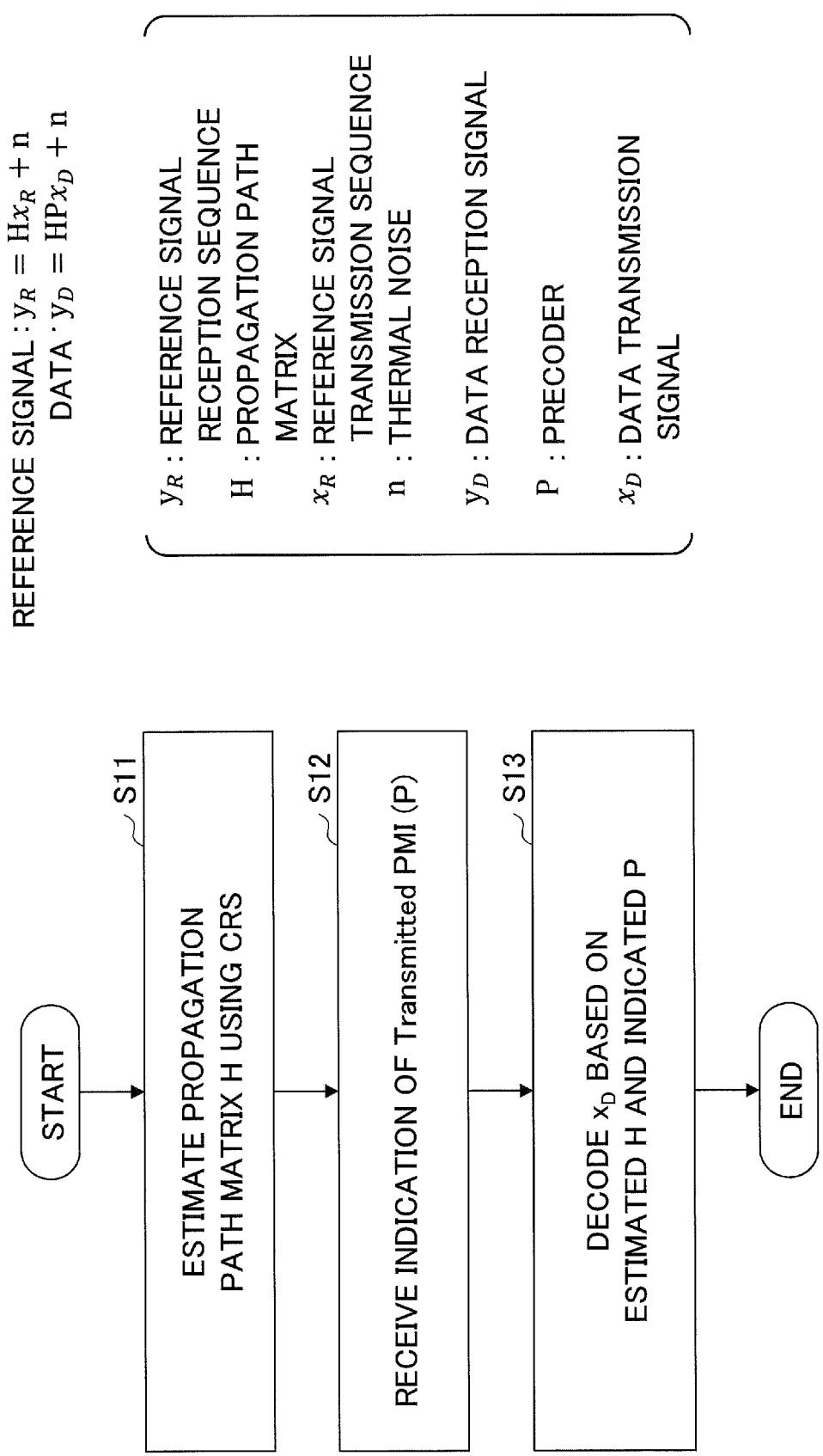
FIG. 9 is a drawing illustrating signal reception using a non-precoded reference signal.

FIG. 9 is a drawing illustrating signal reception using a non-precoded reference signal. FIG. 9 corresponds, for example, to an example of signal reception in a CRS-based transmission method of LTE.

In step S11, the terminal 20 estimates a propagation path matrix H by using CRS. As shown in FIG. 9, $y_R=Hx_R+n$, where $y_R$ is a reference signal reception sequence, $x_R$ is a reference signal transmission sequence, H is a propagation path matrix, and n is thermal noise. Therefore, H can be estimated from the reference signal reception sequence $y_R$ and the reference signal transmission sequence $x_R$.

In step S12, the terminal 20 receives an indication of "P" which is a TPMI (Transmitted Precoding Matrix Indicator). TPMI is information indicating the precoder applied at the time of PDSCH transmission.

In step S13, the terminal 20 decodes $x_D$ based on the estimated H and the indicated P. As shown in FIG. 9, $y_D=HPx_D+n$, where $y_D$ is data reception signal, H is a propagation path matrix, P is a precoder, and $x_D$ is a data transmission signal. Therefore, the data transmission signal $x_D$ can be decoded from the data reception signal $y_D$, the propagation path matrix H, and the precoder P.

Figure 10:
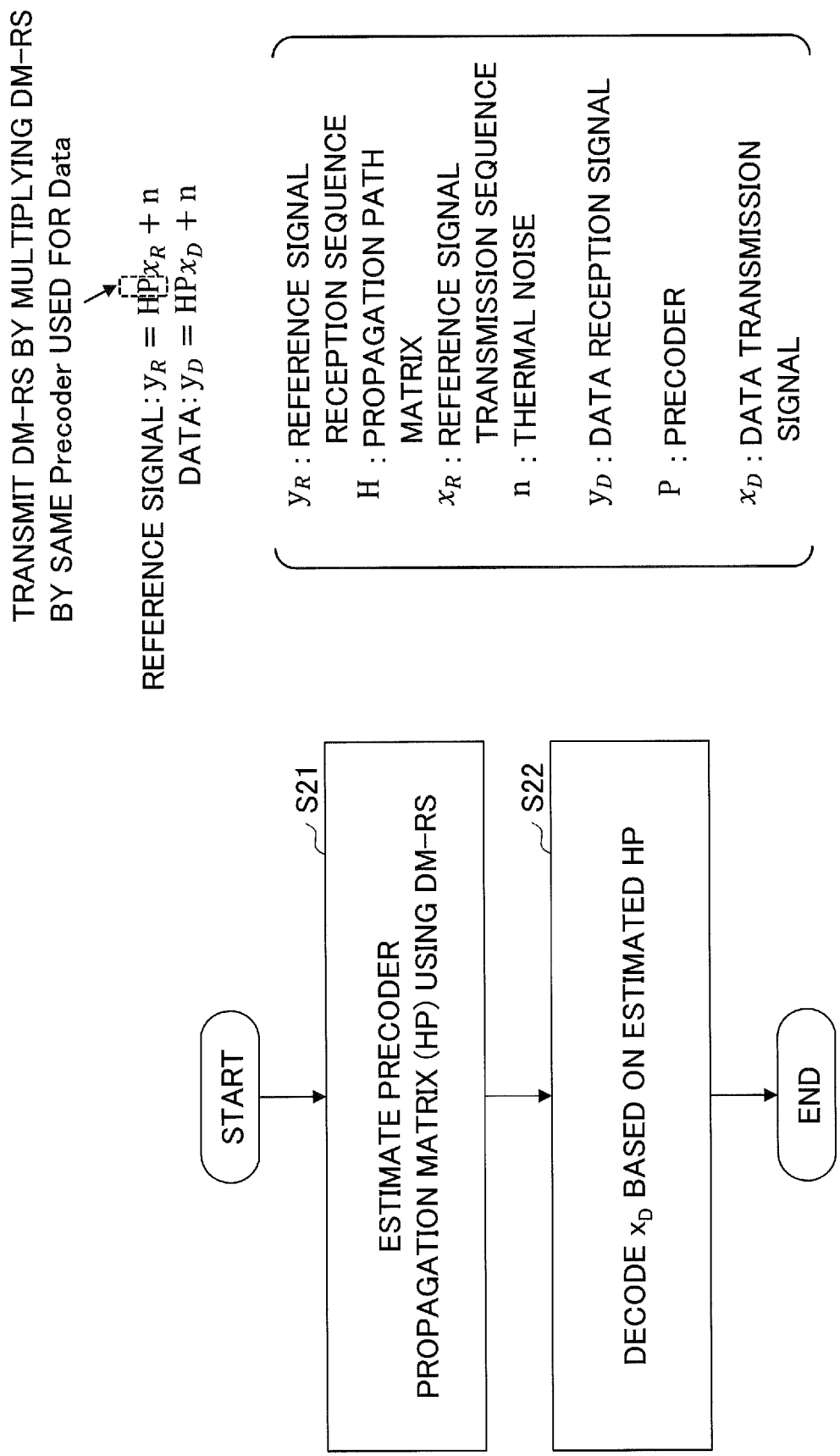
FIG. 10 is a drawing illustrating signal reception using a precoded reference signal.

FIG. 10 is a drawing illustrating signal reception using a precoded reference signal. FIG. 10 corresponds, for example, to an example of signal reception in NR. Unlike FIG. 9, the reference signal is multiplied by the same precoder that is applied to data, and transmitted.

In step S21, the terminal 20 estimates a precoder propagation path matrix HP by using DM-RS. As shown in FIG. 10, $y_R=HPx_R+n$, where $y_R$ is a reference signal reception sequence, $x_R$ is a reference signal transmission sequence, H is a propagation path matrix, P is a precoder, and n is thermal noise. Therefore, HP can be estimated from the reference signal reception sequence $y_R$ and the reference signal transmission sequence $x_R$.

In step S22, the terminal 20 decodes $x_D$ based on the estimated HP. As shown in FIG. 10, $y_D=HPx_D+n$, where $y_D$ is a data reception signal, H is a propagation path matrix, P is a precoder, and $x_D$ is a data transmission signal. Therefore, the data transmission signal $x_D$ can be decoded from the data reception signal $y_D$ and the precoder propagation path matrix HP.

Figure 11:
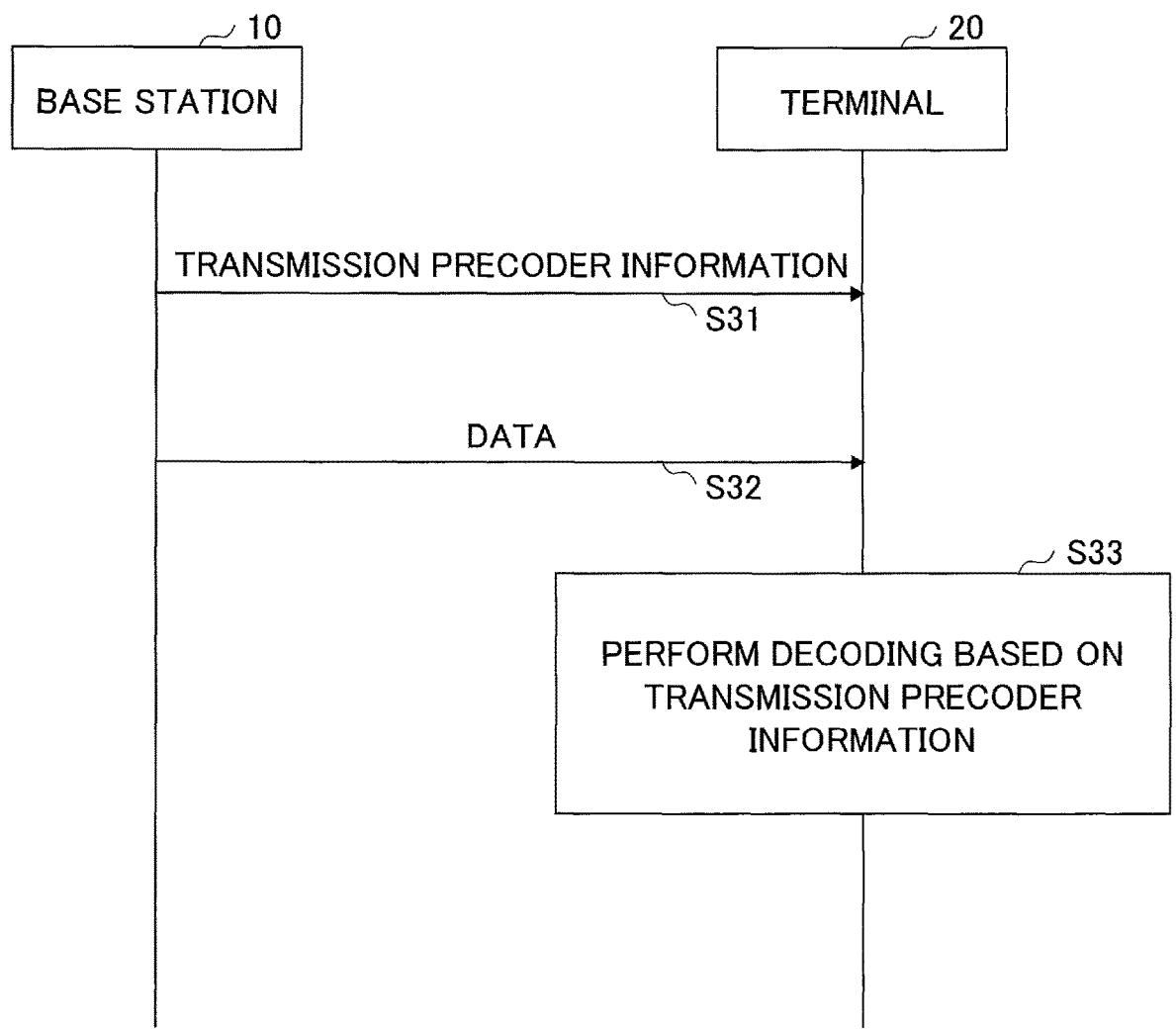
FIG. 11 is a flowchart illustrating an operation example related to signal reception in an embodiment of the present invention.

FIG. 11 is a flowchart illustrating an operation example related to signal reception in an embodiment of the present invention. In order to decode NR data by using CRS, the NR terminal may obtain the precoder information.

In step S31, the terminal 20 receives transmission precoder information from the base station 10. The transmission precoder information may be a TPMI indication, which may be NR codebook based, LTE codebook based, or an existing codebook may be partially applied. Further, the transmission precoder information may a newly specified codebook.

Also, in order to reduce transmission precoder information, frequency selective precoding may not be supported. That is, the terminal 20 may assume the indicated transmission precoder information as the broadband precoder information.

Further, the network may apply the same precoder as the CSI feedback. Further, the network may indicate to the terminal 20 that the same precoder as the CSI feedback has been applied. According to the above arrangement, TPMI signaling overhead can be reduced.

It is noted that a precoder, commonly recognized between the base station and the terminal, may be applied without executing step S31. For example, random precoding, and/or precoder cycling may be applied. Further, as a method of determining a seed of random precoding, the seed may be a CID (Cell ID) or the seed may be indicated to the terminal 20 from the base station 10. Further, a fixed precoder may be applied. For example, a diagonal matrix precoder may be applied.

In step S32, the base station 10 transmits NR data and LTE CRS to the terminal 20. Subsequently, the terminal 20 identifies a precoder based on the transmission precoder information or the common recognition between the base station and the terminal, and decodes data as illustrated in FIG. 9.

It is noted that, when decoding NR data using LTE CRS, the terminal 20 may use a method that does not involve precoding based beam forming. For example, an SFBC (space-frequency block code), which is applied at the time of transmission diversity, may be used for the precoding. Furthermore, for example, large delay CDD (Cyclic Delay Diversity) may be used for the precoding. In addition, the terminal 20 may decode the NR data using the reference signal of the past RAT without using precoding only when the antenna is 1-Tx.

Embodiments of the present invention can be applied regardless of the distinction between uplink, downlink, transmission, or reception. Uplink signals and channels may be replaced with downlink signals and channels, and vice versa. Uplink feedback information may be replaced with downlink control signaling, and vice versa.

Signaling from the base station 10 to the terminal or signaling from the terminal 20 to the base station 10 in the embodiments described above is not limited to explicit methods, but may be indicated in an implicit manner. Further, signaling may not be performed and technical specifications may be uniquely specified.

The signaling from the base station 10 to the terminal 20 or the signaling from the terminal 20 to the base station 10 in the embodiments described above may be signaling of a different layer such as RRC signaling, MAC-CE signaling, or DCI signaling, or may be signaling via broadcast information (MIB (Master Information Block) or SIB (System Information Block)). Further, for example, RRC signaling and DCI signaling may be combined, RRC signaling and MAC-CE signaling may be combined, or RRC signaling, MAC-CE signaling, and DCI signaling may be combined.

In the above-described embodiments, LTE and NR have been described, but the above-described embodiments may be applied to a future communication system (e.g., "6G") beyond NR. For example, the above-described embodiments may be applied to NR and 6G co-existence techniques.

Similarly, in general, a next generation system may receive signals and/or channels of a previous generation system. For example, systems may span multiple generations. For example, a system may apply reference signals of a two generations earlier system. Reference signals of multiple generations may be applied. For example, a system may apply reference signals of a two generations earlier system for synchronization, and may apply reference signals of a previous generation system for data decoding.

While the foregoing describes applying signals and/or channels of a past system to a future system, the reverse is true where signals and/or channels of a future system may be applied to a past system.

The "data" in the above-described embodiments may indicate PDSCH, PDCCH, or PBCH. Further, the "data" may indicate an uplink signal and/or channel.

The embodiments described above can be combined with each other. The features shown in the above-described embodiments can be combined together in various combinations. The combinations are not limited to a particular combination disclosed.

According to the above-described embodiments, the terminal 20 can reduce the amount of NR reference signals by performing NR data decoding using LTE reference signals.

In other words, in a wireless communication system, the overhead can be reduced when multiple RATS (Radio Access Technology) coexist in a single carrier.

(Apparatus Configuration)

Next, a functional configuration example of the base station 10 and the terminal 20 for performing the processes and operations described above will be described. The base station and terminal 20 include functions for implementing the embodiments described above. It should be noted, however, that each of the base stations 10 and the terminal 20 may include only some of the functions in an embodiment.

<Base Station 10>

Figure 12:
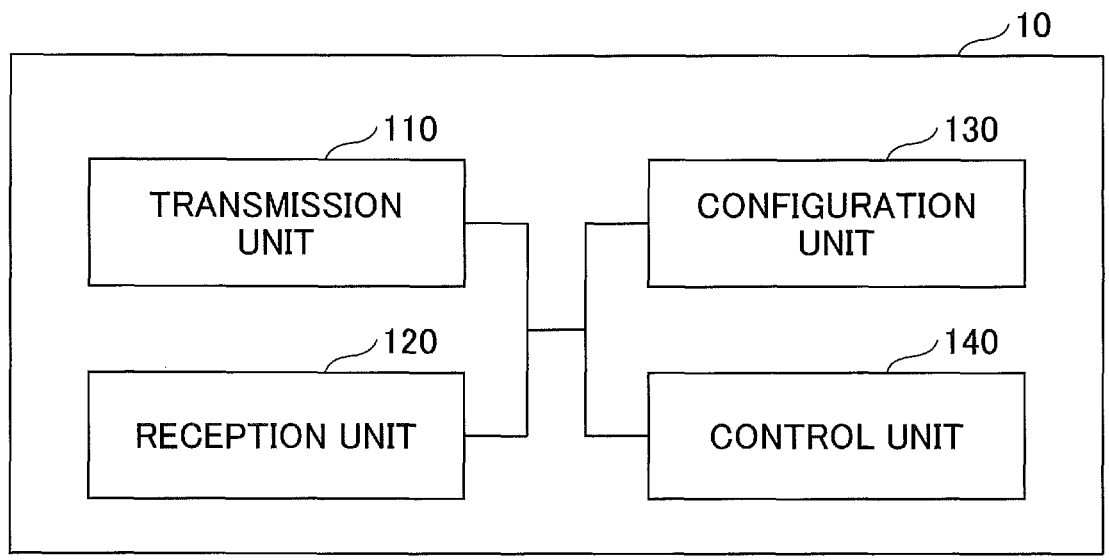
FIG. 12 is drawing illustrating an example of a functional structure of a base station 10 according to an embodiment of the present invention.

FIG. 12 is a drawing illustrating an example of a functional structure of a base station 10 according to an embodiment of the present invention. As shown in FIG. 12, the base station 10 includes a transmission unit 110, a reception unit 120, a configuration unit 130, and a control unit 140. The functional structure illustrated in FIG. 12 is merely an example. Functional divisions and names of functional units may be anything as long as it can perform operations according to an embodiment of the present invention.

The transmission unit 110 includes a function of generating a signal to be transmitted to the terminal 20 side and transmitting the signal wirelessly. Further, the transmission unit 110 transmits an inter-network-node message to another network node. The reception unit 120 includes a function for receiving various signals transmitted from the terminal 20 and acquiring, for example, information of a higher layer from the received signals. Further, the transmission unit 110 has a function to transmit NR-PSS, NR-SSS, NR-PBCH, DL/UL control signals, and the like to the terminal 20. Further, the reception unit 120 receives an inter-network-node message from another network node.

The configuration unit 130 stores preset information and various configuration information items to be transmitted to the terminal 20. Contents of the configuration information are, for example, information related to the DSS configuration.

The control unit 140 performs control related to the DSS configuration as described in the embodiments. Further, the control unit 140 controls communications using DRX. The functional units related to signal transmission in the control unit 140 may be included in the transmission unit 110, and the functional units related to signal reception in the control unit 140 may be included in the reception unit 120.

<Terminal 20>

Figure 13:
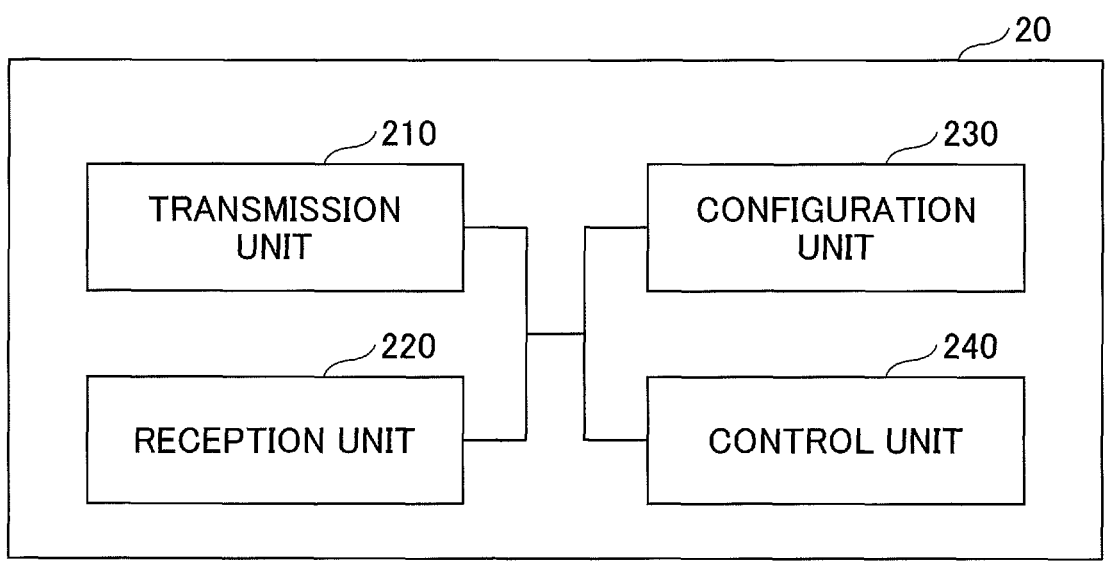
FIG. 13 is drawing illustrating an example of a functional structure of a terminal 20 according to an embodiment of the present invention.

FIG. 13 is a drawing illustrating an example of a functional structure of a terminal 20 according to an embodiment of the present invention. As shown in FIG. 13, the terminal 20 includes a transmission unit 210, a reception unit 220, a configuration unit 230, and a control unit 240. The functional structure illustrated in FIG. 13 is merely an example. Functional divisions and names of functional units may be anything as long as it can perform operations according to an embodiment of the present invention.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL/SL control signals, etc., transmitted from the base station 10. Further, for example, with respect to the D2D communications, the transmission unit transmits, to another terminal 20, PSCCH (Physical Sidelink Control Channel), PSSCH (Physical Sidelink Shared Channel), PSDCH (Physical Sidelink Discovery Channel), PSBCH (Physical Sidelink Broadcast Channel), etc., and the reception unit 220 receives, from the another terminal 20, PSCCH, PSSCH, PSDCH, or PSBCH.

The configuration unit 230 stores various configuration information items received by the reception unit 220 from the base station 10. Further, the configuration unit 230 stores preset configuration information. Contents of the configuration information are, for example, information related to the DSS configuration.

The control unit 240 performs control related to the DSS configuration as described in the embodiments. Further, the control unit 240 controls communications using DRX. The functional units related to signal transmission in the control unit 240 may be included in the transmission unit 210, and the functional units related to signal reception in the control unit 240 may be included in the reception unit 220.

(Hardware Structure)

In the above functional structure diagrams used for describing an embodiment of the present invention (FIG. 12 and FIG. 13), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 14:
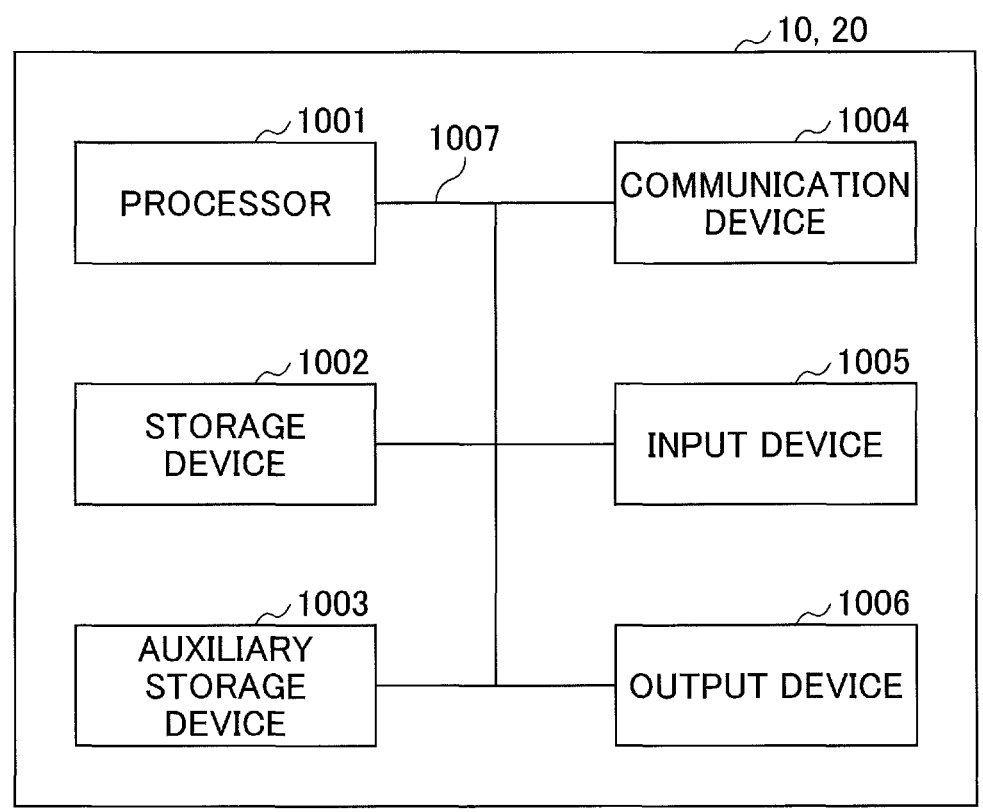
FIG. 14 is a drawing illustrating examples of hardware structures of a base station 10 or terminal 20 according to an embodiment of the present invention.

For example, the base station 10, terminal 20, etc., according to an embodiment of the present disclosure may function as a computer for processing the radio communication method of the present disclosure. FIG. 14 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 12 may be realized by control programs that are stored in the storage device 1002 and are executed by the processor 1001. Further, for example, the control unit 240 of the terminal illustrated in FIG. 13 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission and reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and terminal 20 may include hardware such as a micro processor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a terminal is provided. The terminal includes a reception unit configured to receive a reference signal of a first RAT (Radio Access Technology) and a data signal of a second RAT; and a control unit configured to decode the data signal based on precoder information applied to the reference signal and to the data signal.

According to the above arrangement, the terminal 20 can reduce the amount of NR reference signals by performing NR data decoding using LTE reference signals. In other words, in a wireless communication system, the overhead can be reduced when multiple RATS (Radio Access Technology) coexist in a single carrier.

With respect to the second RAT, transmission may be performed via the same carrier as the first RAT. According to the above arrangement, the terminal 20 can reduce the amount of NR reference signals by performing NR data decoding using LTE reference signals.

The reception unit may receive the precoder information from the base station. According to the above arrangement, the terminal 20 can reduce the amount of NR reference signals by performing NR data decoding using LTE reference signals.

The reception unit may receive, from the base station, information indicating that the precoder information is same as a CSI (Channel State Information) feedback. According to the above arrangement, the terminal 20 can reduce the signaling overhead by performing NR data decoding using the same precoder as the CSI feedback.

The control unit may share the precoder information with the base station in advance. According to the above arrangement, the terminal 20 can reduce the signaling overhead by performing NR data decoding using the precoder shared with the base station 10 in advance.

Further, according to an embodiment of the present invention, a communication method executed by a terminal is provided. The communication method includes: receiving a reference signal of a first RAT (Radio Access Technology) and a data signal of a second RAT; and decoding the data signal based on precoder information applied to the reference signal and to the data signal.

According to the above arrangement, the terminal 20 can reduce the amount of NR reference signals by performing NR data decoding using LTE reference signals. In other words, in a wireless communication system, the overhead can be reduced when multiple RATS (Radio Access Technology) coexist in a single carrier.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication (transmission, notification) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station Apparatus", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, an downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming," "expecting," or "considering," etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "base on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts," "circuits," "devices," etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.,) may be replaced with a TTI having a time length exceeding 1 ms, and the short TTI (e.g., shortened TTI, etc.,) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in a RB may be the same, regardless of the numerology, and may be 12, for example. The number of subcarriers included in a RB may be determined on the basis of numerology.

Further, the time domain of a RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), sub-carrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a UE, one or more BWPs may be configured in one carrier.

At least one of the configured BWPs may be activated, and the UE may assume that the UE will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in a RB, the number of symbols in a TTI, the symbol length, the cyclic prefix (CP) length, and the like, may changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

An aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

It is noted that CRS in the present disclosure is an example of a reference signal.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage apparatus
1003 Auxiliary storage apparatus
1004 Communication apparatus
1005 Input apparatus
1006 Output apparatus

What is claimed is:

1. A terminal comprising:
a receiver configured to receive, from a base station, a reference signal of a first RAT (Radio Access Technology) and a data signal of a second RAT,
wherein the second RAT is configured to perform signal transmission using a same carrier as the first RAT; and
a processor configured to decode the data signal, using a precoder, based on precoder information applied to the reference signal and to the data signal, wherein the processor is configured to encode a CSI (Channel State Information) feedback using the precoder used to decode the data signal, and wherein the precoder information indicates that the precoder used to encode the CSI feedback is the same precoder used to decode the data signal.

2. The terminal according to claim 1, wherein the receiver receives the precoder information from the base station.

3. The terminal according to claim 1, wherein the processor shares the precoder information with the base station in advance.

4. A communication method executed by a terminal, the communication method comprising:

receiving, from a base station, a reference signal of a first RAT (Radio Access Technology) and a data signal of a second RAT, wherein the second RAT is configured to perform signal transmission using a same carrier as the first RAT; and decoding the data signal, using a precoder, based on precoder information applied to the reference signal and to the data signal, wherein a CSI (Channel State Information) feedback is encoded using the precoder used to decode the data signal, and wherein the precoder information indicates that the precoder used to encode the CSI feedback is the same precoder used to decode the data signal.

* * * * *